March 11, 1958     A. J. PIEL     2,826,171
ALL WEATHER FEEDER FOR ANIMALS
Filed Aug. 1, 1956
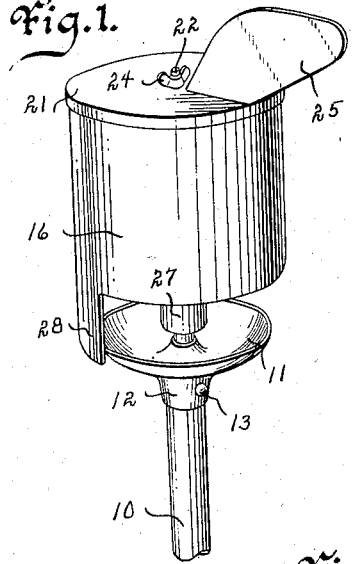
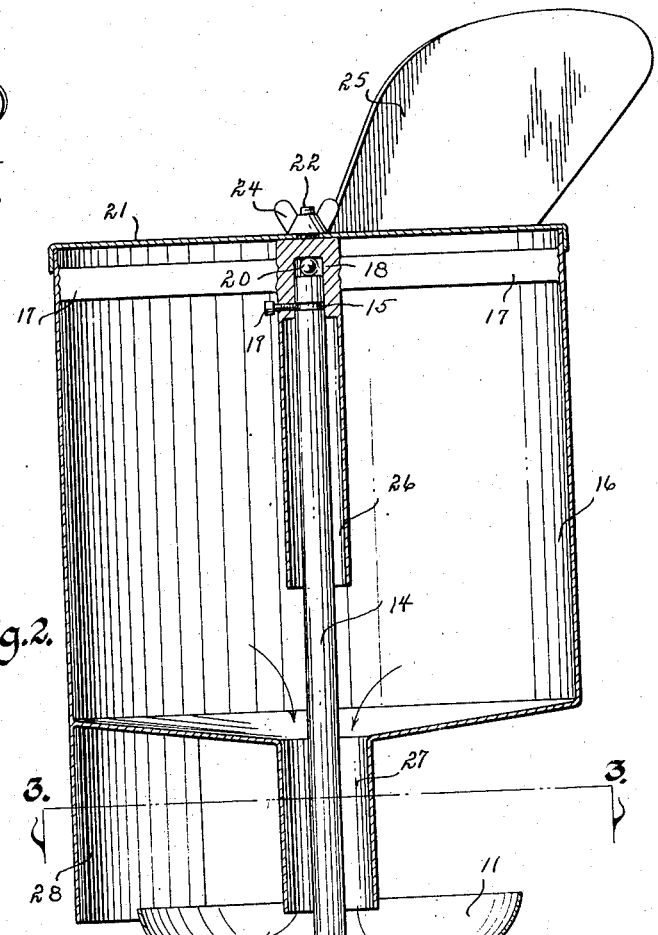
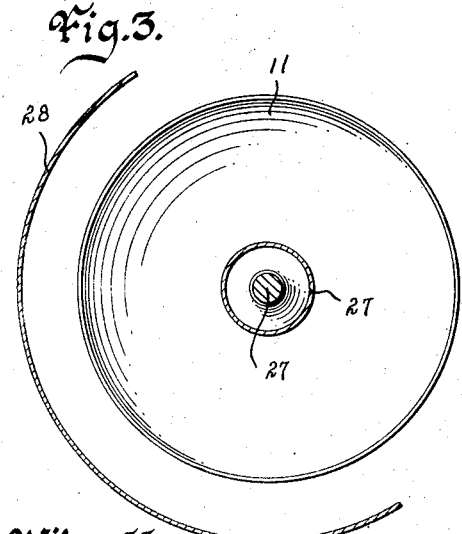
Inventor
Alfred J. Piel
by M. Talbert Dick
Attorney
Witness
Edward P. Seeley

United States Patent Office 2,826,171
Patented Mar. 11, 1958

2,826,171
ALL WEATHER FEEDER FOR ANIMALS

Alfred J. Piel, Hubbard, Iowa

Application August 1, 1956, Serial No. 601,542

5 Claims. (Cl. 119—52)

This invention relates to feeders and more particularly to one for all weather usage in dispensing salts, feed, mineral food supplements and like to livestock.

The successful raising of farm animals requires adequate feeding facilities. The usual method is the employment of troughs into which the feed is periodically placed by the one caring for the stock. Such trough means however have many objections. By being open the feed is subject to damage from the rain, snow, wind and like hazards of the elements. Also frequent servicing by the stock raiser is necessary. Furthermore, troughs are unsanitary and provide a scratching member for animals which often results in the upsetting of the entire feeding means.

Therefore, one of the principal objects of my invention is to provide an animal feeder that protects the feed being dispensed from the elements.

A further object of this invention is to provide a self service strong animal feeder.

A still further object of my invention is to provide an animal feeder having a rotatable canopy, but a stationary food holding portion.

A still further object of this invention is to provide a feed dispenser for animal use that cannot be upset or damaged by the animals using the same.

A still further object of this invention is to provide an animal feeder that has a food supply source actuated by the animal.

Still further objects of my invention are to provide an animal feeder that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings in which:

Fig. 1 is a perspective view of my device ready for use,

Fig. 2 is an enlarged vertical sectional view of the device and more fully illustrates its construction, and Fig. 3 is an enlarged cross sectional view of the feeder taken on line 3—3 of Fig. 2.

While I have indicated my feeder primarily for livestock use, it may be used for feeding fowls, or birds, both domestic or wild.

In the drawings I have used the numeral 10 to designate a vertical metal pipe post. The lower end portion of this post is adapted to be embedded permanently in the ground (not shown). The height of the post above the ground will be in ratio to the height of the animal to be fed. The numeral 11 designates an open top bowl or trough portion preferably circular in shape as shown in Fig. 1. The numeral 12 designates an inverted cap bearing on the center bottom of the bowl 11 and adapted to detachably embrace the upper end portion of the post 10 as shown in Fig. 2. This member 12 is held onto the post by a cotter pinned pin or bolt 13 extending through the member 12 and the post. This structure rigidly fastens the bowl to the top of the post. Extending from the top center of the bowl is a vertical shaft rod 14 having a continuous peripheral groove 15 near its upper end. The numeral 16 designates the auxiliary food supply container preferably circular in cross section and having a diameter greater than that of the diameter of the bowl. This container is open at its top but in its upper portion has a spider 17 carrying an inverted well bearing member 18. This bearing 18 is adapted to detachably embrace the upper end portion of the shaft 14 and is concentric with the horizontal periphery of the container. To prevent the accidental removal of the container from the supporting shaft 14, a set screw 19 is threaded through the bearing 18 and into the groove 15, as shown in Fig. 2. By this construction the container is rotatably mounted on the shaft 14. To render its rotation easier a ball bearing 20 is placed in the bottom of the inverted bearing 18 and the top of the shaft 14. The numeral 21 designates a lid detachably inclosing the open top of the container. This lid is held against accidental detachment by the bearing 18 having an upwardly extending threaded rod 22 extending through the rod and with a butterfly nut 24 threaded thereon. The numeral 25 designates a weather vane on the lid and at one side of its center, as shown in Fig. 1. The numeral 26 designates a tube portion on the lower end of the bearing 18 loosely embracing the shaft 14 and limiting the tilting action of the container on the shaft 14. The bottom of the container is in the form of a feeding hopper and which terminates in a downwardly extending spout feeding pipe 27 by having a diameter substantially greater than that of the shaft 14. The lower end of this pipe 27 is in a plane below the horizontal top plane of the feeding bowl. The numeral 28 designates a downwardly extending skirt from one half of the circular side wall of the container as shown in Fig. 3. Due to the size of the container this semicircular skirt cuts a radius greater than that of the trough bowl. It also extends downwardly to a horizontal plane below the upper rim of the trough bowl.

The practical operation of the device is as follows: The wing nut is removed and the lid taken off for the purpose of filling the supply container with the material to be dispensed into the feeding trough bowl. After filling, the lid is replaced, but in a position where the weather vane is opposite to the container shield skirt 28 as shown in Fig. 1. The wing nut is then replaced and tightened. The material to be dispensed will run downwardly through the tube 27 until the trough bowl is filled to a level with its open end. The rotating of the device by wind action also aids in guiding the material from the container downwardly around the rod shaft and into the bowl. Also the animal will contact the pipe tube 27, agitate the upper unit, and cause material to feed into the trough bowl. To prevent harm to the animal by the parts being frozen during cold weather the trough bowl and tube 27 may be coated or covered with a non-metallic substance such as rubber, plastic or like. As the trough bowl is stationary, it cannot be spun by the animal and feed material thrown out. The skirt will always be facing the wind, rain, snow, dust or like, and thereby shield the contents in the trough bowl against the elements. Due to the capacity of the supply tank container, the same will only have to be replenished occasionally. The device will furnish clean material to the bowl only as needed. As the device is well anchored, the animals cannot upset it or damage it.

If desired the entire upper unit may be removed from a given post and placed on another post. Or if desired only the supply unit may be transferred. This is accomplished by merely removing the set screw from engagement with the groove in the upper end portion of the shaft rod, at which time the unit may be lifted upwardly from the shaft rod.

Some changes may be made in the construction and arrangement of my all weather feeder for animals without departing from the real spirit and purpose of my invention, and it is my intention to cover by my claims, any modified forms of structure or use of mechanical equivalents which may be reasonably included within their scope.

I claim:

1. In a feeder, a vertical post, a trough bowl on said post, a shaft portion extending upwardly from said trough bowl, a supply container rotatably mounted on said shaft portion and positioned a substantial distance above said trough bowl, an arcular skirt shield extending vertically downwardly from the lower portion of said container to terminate at the outer side of said trough bowl and at a horizontal plane below the top of said trough bowl, and a feeding tube extending downwardly from said container, loosely embracing said shaft portion and having its lower free end terminating in said trough bowl at a horizontal plane below the horizontal top plane of said trough bowl.

2. In a feeder, a vertical post, a trough bowl on said post, a shaft portion extending upwardly from said trough bowl, a supply container rotatably mounted on said shaft portion and positioned a substantial distance above said trough bowl, an arcular skirt shield extending downwardly from the lower portion of said container and having its lower end outside and in a plane below the top plane of said trough bowl, and a feeding tube extending downwardly from said container, loosely embracing said shaft portion and having its lower free end terminating in said trough bowl at a horizontal plane below the horizontal top plane of said trough bowl.

3. In a feeder, a vertical post, a trough bowl on said post, a shaft portion extending upwardly from said trough bowl, a supply container rotatably mounted on said shaft portion and positioned a substantial distance above said trough bowl, an arcular skirt shield extending downwardly from the lower portion of said container and having its lower end outside and in a plane below the top plane of said trough bowl, a weather vane operatively connected to said container, and a feeding tube extending downwardly from said container, loosely embracing said shaft portion and having its lower free end terminating in said trough bowl at a horizontal plane below the horizontal top plane of said trough bowl.

4. In a feeder, a vertical post, a trough bowl on said post, a shaft portion extending upwardly from said trough bowl, a supply container rotatably mounted on said shaft portion and positioned a substantial distance above said trough bowl, an arcular skirt shield extending downwardly from the lower portion of said container and having its lower end outside and in a plane below the top plane of said trough bowl, a feeding tube extending downwardly from said container, loosely embracing said shaft portion and having its lower free end terminating in said trough bowl at a horizontal plane below the horizontal top plane of said trough bowl; said container, and said trough bowl being circular, and a weather vane on said container for causing it to rotate to a position where said shield will be facing in the direction of the wind.

5. In a feeder, a vertical post, a trough bowl on said post, a shaft portion extending upwardly from said trough bowl, a supply container rotatably mounted on said shaft portion and positioned a substantial distance above said trough bowl, an arcular sectional skirt shield extending downwardly from the lower portion of said container and having its lower end outside and in a plane below the top plane of said trough bowl, a feeding tube extending downwardly from said container, loosely embracing said shaft portion and having its lower free end terminating in said trough bowl at a horizontal plane below the horizontal top plane of said trough bowl; said container, and said trough bowl being circular with said container being of a diameter greater than that of the diameter of said trough bowl, and a weather vane secured to said container at a point diametrically opposite from that of the area where said shield extends from said container.

References Cited in the file of this patent

UNITED STATES PATENTS

| | | |
|---|---|---|
| 1,148,301 | Enos | July 27, 1915 |
| 2,566,446 | Gomer | Sept. 4, 1951 |